US010974571B2

(12) United States Patent
Oshikiri et al.

(10) Patent No.: US 10,974,571 B2
(45) Date of Patent: Apr. 13, 2021

(54) VEHICLE AIR CONDITIONING SYSTEM THAT ALLOWS A COMPRESSOR TO STOP WHEN AN EVAPORATOR IS IN A DRY STATE

(71) Applicant: TOYOTA JIDOSHA KABUSHIKI KAISHA, Toyota (JP)

(72) Inventors: Rino Oshikiri, Toyota (JP); Kunihiko Jinno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 16/433,020

(22) Filed: Jun. 6, 2019

(65) Prior Publication Data
US 2019/0381865 A1 Dec. 19, 2019

(30) Foreign Application Priority Data
Jun. 19, 2018 (JP) .............................. JP2018-116050

(51) Int. Cl.
*B60H 1/32* (2006.01)
*B60H 1/00* (2006.01)
*F24F 130/10* (2018.01)

(52) U.S. Cl.
CPC ....... *B60H 1/3216* (2013.01); *B60H 1/00735* (2013.01); *B60H 1/00771* (2013.01); *B60H 1/00878* (2013.01); *B60H 2001/3238* (2013.01); *F24F 2130/10* (2018.01)

(58) Field of Classification Search
CPC .............. B60H 1/3216; B60H 1/00771; B60H 1/00735; F24F 2130/10
See application file for complete search history.

(56) References Cited

U.S. PATENT DOCUMENTS 6,035,649 A * 3/2000 Straub ...................... F24F 11/70 62/93
6,330,909 B1 * 12/2001 Takahashi ............. F25B 41/062 165/202
8,694,205 B1 * 4/2014 Yerke ................. B60H 1/00742 701/36

(Continued)

FOREIGN PATENT DOCUMENTS

JP 2012-040924 A 3/2012
JP 2015-074364 A 4/2015
(Continued)

*Primary Examiner* — Jonathan Bradford
(74) *Attorney, Agent, or Firm* — Oliff PLC

(57) ABSTRACT

A vehicle air conditioning system includes an in-vehicle air conditioner that includes a refrigerant circulation circuit including a compressor and an evaporator; a weather information acquiring section configured to acquire weather information at a current location of a vehicle; an evaporator drying determining section configured to estimate a water retention amount of the evaporator based on the weather information acquired by the weather information acquiring section and an operation state of the in-vehicle air conditioner, and to determine whether the evaporator is in a dry state; and a compressor stop permitting section configured to output a permission signal for permitting stop of the compressor on a condition that the evaporator drying determining section determines that the evaporator is in the dry state.

13 Claims, 9 Drawing Sheets

(56) References Cited

U.S. PATENT DOCUMENTS

| | | | |
|---|---|---|---|
| 2003/0046943 A1* | 3/2003 | Takano | B60H 1/3213 62/186 |
| 2016/0052366 A1* | 2/2016 | Hoke | B60H 1/00785 219/203 |
| 2016/0114651 A1* | 4/2016 | Mayer | B60H 1/3207 165/230 |
| 2017/0320376 A1* | 11/2017 | Sago | H05B 3/267 |
| 2017/0368906 A1 | 12/2017 | Inui et al. | |

FOREIGN PATENT DOCUMENTS

| | | |
|---|---|---|
| JP | 2016-141296 A | 8/2016 |
| JP | 2017-226397 A | 12/2017 |

* cited by examiner

VEHICLE AIR CONDITIONING SYSTEM THAT ALLOWS A COMPRESSOR TO STOP WHEN AN EVAPORATOR IS IN A DRY STATE

INCORPORATION BY REFERENCE

The disclosure of Japanese Patent Application No. 2018-116050 filed on Jun. 19, 2018 including the specification, drawings and abstract is incorporated herein by reference in its entirety.

BACKGROUND

1. Technical Field

The disclosure relates to a vehicle air conditioning system. In particular, the disclosure relates to improvement in control of a compressor in a refrigerant circulation circuit provided in an in-vehicle air conditioner.

2. Description of Related Art

As disclosed in Japanese Patent Application Publication No. 2016-141296 (JP 2016-141296 A), an air conditioner (an air conditioning unit) mounted on a vehicle includes a refrigerant circulation circuit. This refrigerant circulation circuit includes a compressor operated at the time of circulating a refrigerant, an evaporator disposed in an air conditioning duct, and the like. When a cabin is cooled, the refrigerant is circulated in conjunction with the operation of the compressor, and the refrigerant is then evaporated in the evaporator to cool air (for example, outside air introduced into the air conditioning duct) flowing through the air conditioning duct. Consequently, conditioned air is produced and blown into the cabin. When passing through the evaporator, the air is also dehumidified (the air is dehumidified when the evaporator condenses water vapor in the air). Also, when the cabin is warmed, the compressor is operated to circulate the refrigerant for a purpose of decreasing a humidity level in the cabin to prevent or eliminate fogging (fogging resulting from the condensation of the water vapor on an inner surface of a window on the cabin-side) of a window (for example, a windshield). That is, after the air flowing through the air conditioning duct passes through the evaporator for dehumidification, the air is heated by using a heating source such as an engine coolant and blown into the cabin as the conditioned air.

In JP 2016-141296 A, it is described that a humidity sensor detecting the humidity level in the cabin is provided and the compressor in the refrigerant circulation circuit is controlled in accordance with the humidity level in the cabin. More specifically, in the case where the humidity level in the cabin is equal to or higher than a specified value, the compressor is operated to dehumidify the air in the cabin to suppress fogging of the window. Meanwhile, in the case where the humidity level in the cabin is lower than the specified value, stop of the compressor is permitted. Then, in the case where there is no compressor operation request due to another condition (for example, a manual ON operation on an air conditioner switch or the like), the compressor is stopped. As a result, the fogging of the window is prevented or eliminated while a decrease of an energy consumption rate resulting from the unnecessary operation of the compressor is restrained.

SUMMARY

However, the vehicle air conditioning system disclosed in JP 2016-141296 A requires the humidity sensor detecting the humidity level in the cabin. This complicates a configuration, increases vehicle weight, and increases cost. In addition, in the case where the state of the compressor is switched between an operated state and a stopped state without using the humidity sensor (for example, in the case where the state of the compressor is switched between the operated state and the stopped state at regular intervals), there is a possibility that the fogging of the window is not reliably avoided.

The disclosure provides a vehicle air conditioning system that makes it possible to reliably avoid fogging of a window without using a humidity sensor.

An aspect of the disclosure relates to a vehicle air conditioning system including an in-vehicle air conditioner that includes a refrigerant circulation circuit including a compressor and an evaporator; a weather information acquiring section, an evaporator drying determining section, and a compressor stop permitting section. The weather information acquiring section is configured to acquire weather information at a current location of a vehicle. The evaporator drying determining section is configured to estimate a water retention amount of the evaporator based on the weather information acquired by the weather information acquiring section and an operation state of the in-vehicle air conditioner, and to determine whether the evaporator is in a dry state. The compressor stop permitting section is configured to output a permission signal for permitting stop of the compressor on a condition that the evaporator drying determining section determines that the evaporator is in the dry state.

A cause of fogging of a window in the vehicle is that high humid wind (air) is blown onto the window (an inner surface of the window on the cabin-side). In the above-described aspect, in view of the cause, the evaporator drying determining section determines whether the evaporator is in the dry state (determines whether there is a possibility that moisture that is the cause of the fogging of the window and has been eliminated flows into the cabin again, and the high humid wind is blown onto the window), and thereby determines whether the stop of the compressor can be permitted (whether the stop of the compressor can be permitted due to a situation where the fogging of the window does not occur). Then, in the case where the above-described cause of the fogging of the window does not exist, the compressor stop permitting section outputs the permission signal, so as to permit the stop of the compressor. In the case where this permission signal is output, the compressor is stopped in a situation where there is no other compressor operation request (for example, a manual ON operation on an air conditioner switch or the like). That is, the compressor is stopped in the situation where the fogging of the window does not occur. In this way, while an energy consumption rate is improved, the fogging of the window can be reliably avoided without using a humidity sensor.

The vehicle air conditioning system according to the above-described aspect may further include an in-cabin moisture determining section configured to determine presence or absence of moisture brought into a cabin of the vehicle from an outside of the vehicle based on the weather information acquired by the weather information acquiring section; and a rainfall determining section configured to determine presence or absence of rainfall at the current location. The compressor stop permitting section may be configured to output the permission signal for permitting the stop of the compressor in a case where the in-cabin moisture determining section determines that the moisture brought into the cabin from the outside of the vehicle is absent, the rainfall determining section determines that the rainfall is absent at the current location, and the evaporator drying determining section determines that the evaporator is in the dry state.

The causes of the fogging of the window in the vehicle are that the moisture is brought into the cabin, that the high humid wind (air) is blown onto the window (the inner surface of the window on the cabin-side), and a situation where a temperature of the window is likely to be decreased. In the above-described aspect, in view of these causes, the in-cabin moisture determining section determines the presence or absence of the moisture brought into the cabin of the vehicle from the outside of the vehicle (determines whether the moisture has been brought into the cabin, that is, whether the cause of the fogging of the window exists), the rainfall determining section determines the presence or absence of the rainfall at the current location of the vehicle (determines whether the high humid wind is blown onto the window or the temperature of the window is likely to be decreased, that is, whether the cause of the fogging of the window exists), and the evaporator drying determining section determines whether the evaporator is in the dry state (determines whether there is the possibility that the moisture that is the cause of the fogging of the window and has been eliminated flows into the cabin again, and the high humid wind is blown onto the window), and thereby determines whether the stop of the compressor can be permitted (whether the stop of the compressor can be permitted due to the situation where the fogging of the window does not occur). Then, in the case where none of the above-described causes of the fogging of the window exists, the compressor stop permitting section outputs the permission signal, so as to permit the stop of the compressor. In the case where this permission signal is output, the compressor is stopped in the situation where there is no other compressor operation request (for example, the manual ON operation on the air conditioner switch or the like). That is, the compressor is stopped in the situation where the fogging of the window does not occur. In this way, while the energy consumption rate is improved, the fogging of the window can be reliably avoided without using the humidity sensor.

The evaporator drying determining section may be configured to calculate the water retention amount that is an amount of water generated by condensation and retained in the evaporator based on the weather information acquired by the weather information acquiring section, an operation state of the compressor, and an amount of air passing through the evaporator, and to determine that the evaporator is in the dry state in a case where the calculated water retention amount is smaller than a specified amount.

In the case where the water retention amount of the evaporator is large, there is a possibility that the moisture that has been eliminated by this evaporator flows into the cabin again and the high humid wind is blown onto the window, which causes the fogging of the window. In the above-described configuration, presence or absence of the cause of the fogging of the window is determined on the basis of whether the water retention amount of the evaporator, which is calculated from the weather information (an outside air temperature, an outside humidity level, and the like), the operation state of the compressor, and the amount of air passing through the evaporator, exceeds the specified amount. In the case where the water retention amount of the evaporator is smaller than the specified amount, it is determined that the evaporator is in the dry state and one of the conditions to permit the stop of the compressor is satisfied. On the other hand, in the case where the water retention amount of the evaporator exceeds the specified amount, the evaporator is not in the dry state, and thus the fogging of the window is prevented by not permitting the stop of the compressor.

The moisture brought into the cabin of the vehicle from the outside of the vehicle may include moisture brought during getting-on that is moisture brought into the cabin when an occupant gets on the vehicle; and the in-cabin moisture determining section may be configured to determine that the moisture brought during getting-on is absent in a case where all of the rainfall, snowfall, and accumulated snow have been absent at the current location where the vehicle is stopped within a past specified period prior to a time point at which the occupant gets on the vehicle.

In the case where any one of the rainfall, the snowfall, and the accumulated snow has been present at the current location where the vehicle is stopped within the past specified period (for example, one hour) prior to the time point at which the occupant gets on the vehicle, it is assumed that a wet umbrella is brought into the cabin or the occupant wearing wet clothing gets on the vehicle. In this way, it can be determined that the moisture that will eventually be evaporated in the future and become the cause of the fogging of the window (the moisture brought during getting-on) has been brought into the cabin. Thus, in the above-described configuration, in the case where all of the rainfall, the snowfall, and the accumulated snow have been absent at the current location where the vehicle is stopped within the past specified period prior to the time point at which the occupant gets on the vehicle, it is determined that the moisture brought during getting-on is absent (it is determined that one of the conditions to permit the stop of the compressor is satisfied). If not (in the case where any one of the rainfall, the snowfall, and the accumulated snow has been present), it is determined that the moisture brought during getting-on is present, and the fogging of the window is prevented by not permitting the stop of the compressor.

The moisture brought into the cabin of the vehicle from the outside of the vehicle may include brought and remaining moisture that is moisture brought into the cabin in a past and evaporated; and the in-cabin moisture determining section may be configured to determine that the brought and remaining moisture is absent in a case where the occupant has gotten on the vehicle a plurality of times within the past specified period prior to the time point at which the occupant gets on the vehicle, and the in-cabin moisture determining section determines that the moisture brought during getting-on has been absent on all of occasions where the occupant has gotten on the vehicle within the past specified period.

In the case where the umbrella or the like that is wet due to rain was brought into the cabin in the past and remains in the cabin for a specified period (for example, the specified period within 24 hours), the moisture is evaporated to increase a humidity level in the cabin, which causes the fogging of the window. In view of this, in the above-described configuration, in the case where the occupant has gotten on the vehicle a plurality of times within the past specified period prior to the time point at which the occupant gets on the vehicle and it is determined that the moisture brought during getting-on has been absent (for example, an umbrella or the like that is wet due to rain has not been brought into the cabin) on all of occasions where the occupant has gotten on the vehicle within the past specified period, it is determined that the moisture brought during getting-on is absent (it is determined that one of the conditions to permit the stop of the compressor is satisfied). If not (in the case where it is determined that the moisture brought during getting-on has been present within the past specified period), it is determined that the brought and remaining moisture is present, and the fogging of the window is prevented by not permitting the stop of the compressor.

The rainfall determining section may be configured to acquire the weather information at the current location of the vehicle, which is acquired by the weather information acquiring section, and operation information on a wiper device mounted on the vehicle, and to determine that the rainfall is absent at the current location of the vehicle in a case where each of the weather information and the operation information on the wiper device is information based on which the rainfall is determined to be absent.

In the case where the rainfall is present at the current location of the vehicle, the high humid wind may be blown onto the window in a situation where conditioned air is blown onto the window. Thus, the fogging of the window may be caused. In addition, in the case where the rainfall is present at the current location of the vehicle, the window is cooled by rainwater and a temperature of the window is likely to be decreased (water vapor is likely to be condensed due to the low temperature of the window). This also causes the fogging of the window. In the above-described configuration, the presence or absence of the cause of the fogging of the window is determined on the basis of whether the rainfall is present at the current location of the vehicle. More specifically, the presence or absence of the cause of the fogging of the window is determined on the basis of the weather information and the operation information on the wiper device. In the case where it is determined that the rainfall is absent at the current location of the vehicle, one of the conditions to permit the stop of the compressor is satisfied. On the other hand, in the case where it is determined that the rainfall is present at the current location of the vehicle, the fogging of the window is prevented by not permitting the stop of the compressor.

In the case where the vehicle air conditioning system is configured to include the vehicle and a cloud server configured to communicate with the vehicle, the following configuration of the vehicle air conditioning system is provided.

The weather information acquiring section, the in-cabin moisture determining section, the rainfall determining section, the evaporator drying determining section, and the compressor stop permitting section may be provided in a cloud server configured to communicate with the vehicle; and a control unit for the in-vehicle air conditioner may be configured to receive the permission signal output from the compressor stop permitting section of the cloud server.

In the above-described configuration of the system, the cloud server determines whether to permit the stop of the compressor (whether to output the permission signal). On the vehicle-side, the control unit for the in-vehicle air conditioner determines whether to stop the compressor in accordance with whether the permission signal is received from the cloud server. Thus, a processing load of the control unit for the in-vehicle air conditioner can be reduced.

The weather information acquiring section may be provided in a cloud server configured to communicate with the vehicle; the in-cabin moisture determining section, the rainfall determining section, the evaporator drying determining section, and the compressor stop permitting section may be provided in the vehicle; and the cloud server may be configured to receive information on the current location from the vehicle and to transmit the weather information on the current location to the vehicle.

In the above-described configuration of the system, the determination on whether to permit the stop of the compressor (whether to output the permission signal) is performed by the vehicle-side (i.e., the control unit on the vehicle-side). That is, processing of the cloud server is to transmit the weather information corresponding to the vehicle (the weather information at the current location of the vehicle) to the vehicle. Thus, a processing load of the cloud server can be reduced. As a result, in the case where the vehicle air conditioning system is realized for a large number of the vehicles, practical utility of the vehicle air conditioning system can be improved.

In the above-described aspect of the disclosure, on the condition that it is determined that the evaporator provided in the refrigerant circulation circuit is in the dry state, the permission signal for permitting the stop of the compressor in the refrigerant circulation circuit is output. In this way, while the energy consumption rate is improved by restraining the unnecessary operation of the compressor, the fogging of the window can be reliably avoided without using the humidity sensor.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A description will hereinafter be provided on embodiments of the disclosure with reference to the drawings.

Figure 1:
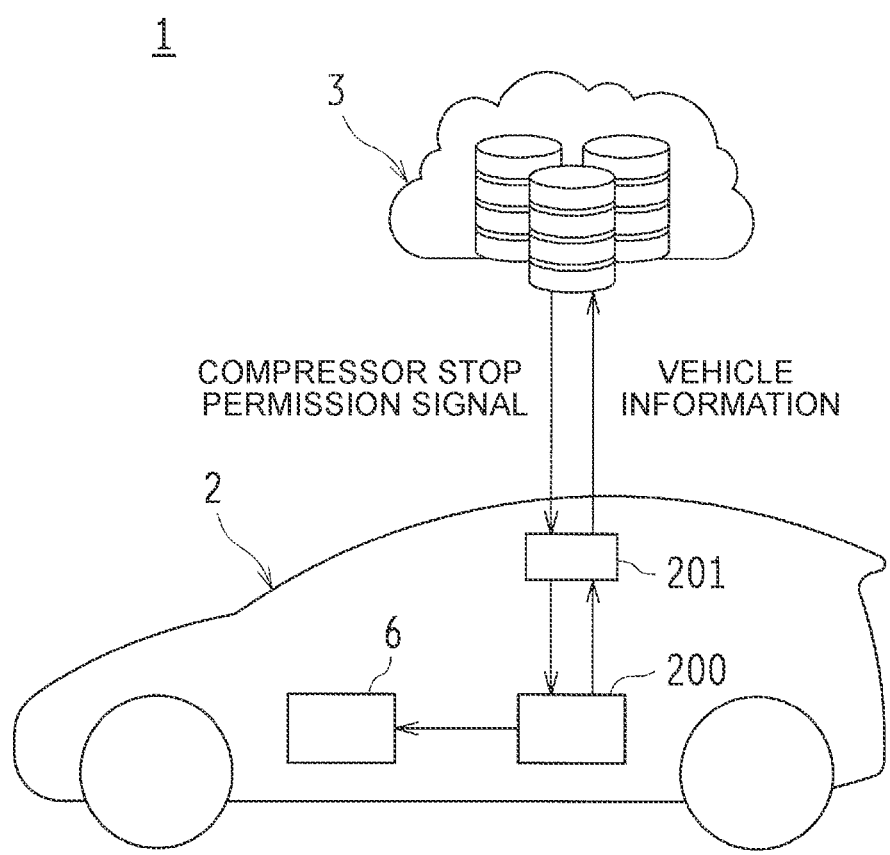
FIG. 1 is a schematic configuration diagram of a vehicle air conditioning system according to an embodiment.
Figure 2:
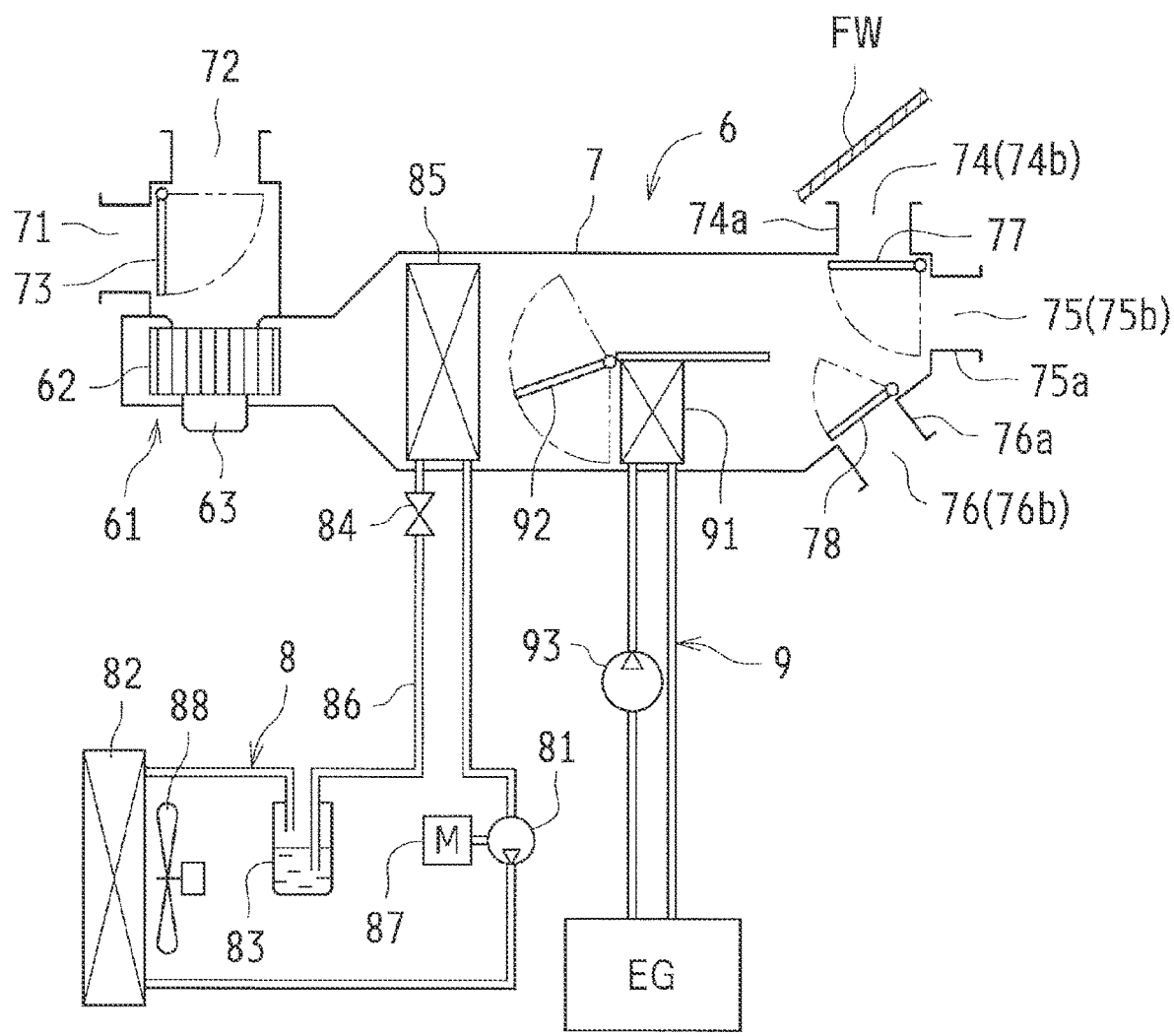
FIG. 2 is a schematic configuration diagram of an air conditioning unit mounted on a vehicle.
Figure 3:
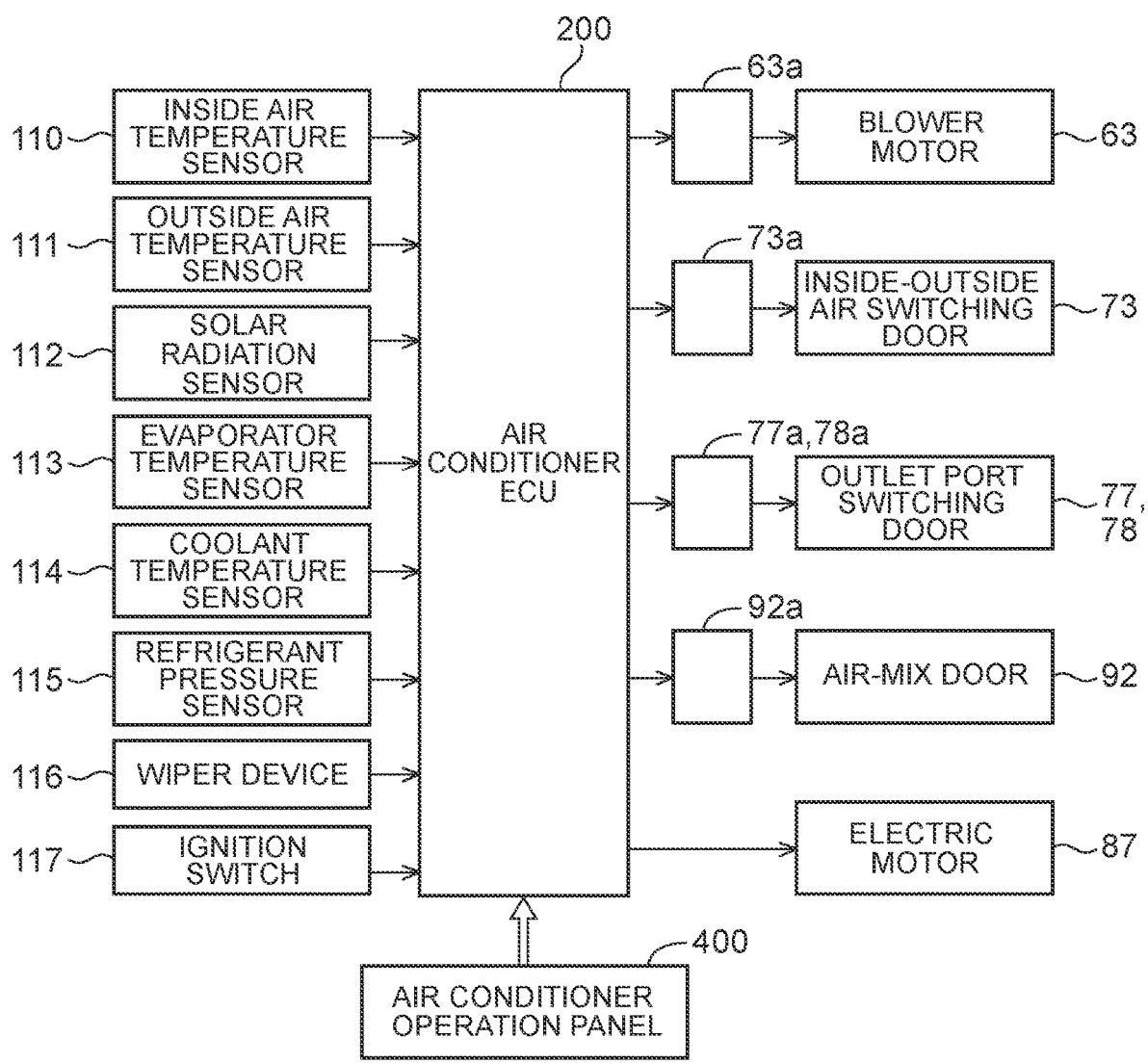
FIG. 3 is a block diagram of a schematic configuration of a control system in the air conditioning unit.

FIG. 1 is a schematic configuration diagram of a vehicle air conditioning system 1 in this embodiment. FIG. 2 is a schematic configuration diagram of an air conditioning unit (an in-vehicle air conditioner) 6 mounted on a vehicle 2. FIG. 3 is a block diagram showing a schematic configuration of a control system in the air conditioning unit 6.

As shown in FIG. 1, the vehicle air conditioning system 1 includes the vehicle 2 and a cloud server 3.

The air conditioning unit 6 for air-conditioning (i.e., the air conditioning unit 6 configured to condition air) in a cabin is mounted on the vehicle 2. In the vehicle air conditioning system 1 according to this embodiment, various kinds of information are exchanged (transmitted and received) between the cloud server 3 and an air conditioner ECU (a control unit for the in-vehicle air conditioner) 200 that controls the air conditioning unit 6 such that the air conditioning unit 6 (particularly, a compressor 81) is controlled.

A transceiver 201 configured to exchange the information with the cloud server 3 is mounted on the vehicle 2. This transceiver 201 and the cloud server 3 each have a wireless communication function and are connected to a network (such as the Internet) via a wireless base station or a wireless access point. As a result, vehicle information (information on a current location of the vehicle 2, information on an operating state of the air conditioning unit 6, and the like) is transmitted from the air conditioner ECU 200 to the cloud server 3 via the transceiver 201, and a compressor stop permission signal (a signal for permitting stop of the compressor 81 in the air conditioning unit 6) and the like are transmitted from the cloud server 3 to the air conditioner ECU 200.

Next, the air conditioning unit 6 will be described. As shown in FIG. 2, the air conditioning unit 6 includes an air conditioning duct 7 defining an air passage through which conditioned air is delivered to the cabin; a centrifugal blower (an air conditioning blower) 61 configured to produce an air stream in this air conditioning duct 7; a refrigerant circulation circuit 8 configured to cool the air that flows through the air conditioning duct 7; a coolant circuit 9 configured to heat the air that flows through the air conditioning duct 7; and the like.

A most upstream (windward-side) portion of the air conditioning duct 7 is a portion forming a suction port switching box (an inside-outside air switching box) and includes an inside air suction port 71 from which in-cabin air (inside air) is suctioned; and an outside air suction port 72 from which air outside the cabin (outside air) is suctioned.

An inside-outside air switching door 73 is rotatably attached at a position inward of the inside air suction port 71 and the outside air suction port 72. This inside-outside air switching door 73 is driven by an actuator 73a (see FIG. 3) such as a servomotor and switches a suction port mode between an inside air circulation mode and an outside air introduction mode.

A most downstream (leeward-side) portion of the air conditioning duct 7 is a portion forming an outlet port switching box and includes a defroster (DEF) opening 74, a face (FACE) opening 75, and a foot (FOOT) opening 76.

The DEF opening 74 is provided with a defroster duct 74a. At a most downstream end of this defroster duct 74a, a defroster (DEF) outlet port 74b is formed. The conditioned air is blown from the DEF outlet port 74b onto an inner surface of a front windshield FW (hereinafter simply referred to as a window) of the vehicle 2.

The FACE opening 75 is provided with a face duct 75a. At a most downstream end of this face duct 75a, a FACE outlet port 75b is formed. The conditioned air is blown from the FACE outlet port 75b to a head and a chest of an occupant.

The FOOT opening 76 is provided with a foot duct 76a. At a most downstream end of this foot duct 76a, a FOOT outlet port 76b is formed. The conditioned air is blown from the FOOT outlet port 76b to feet of the occupant.

Outlet port switching doors 77, 78 are rotatably attached at positions inward of the outlet ports 74b, 75b, 76b. These outlet port switching doors 77, 78 are driven by actuators 77a, 78a (see FIG. 3) such as the servomotors, respectively, and switch an outlet port mode to any one of a FACE mode, a bi-level (B/L) mode, a FOOT mode, a foot-defroster (F/D) mode, and a defroster (DEF) mode. In the FACE mode, the conditioned air is blown only from the FACE outlet port 75b. In the B/L mode, the conditioned air is blown from the FACE outlet port 75b and the FOOT outlet port 76b. In the FOOT mode, the conditioned air is blown only from the FOOT outlet port 76b. In the F/D mode, the conditioned air is blown from the FOOT outlet port 76b and the DEF outlet port 74b. In the DEF mode, the conditioned air is blown only from the DEF outlet port 74b.

The centrifugal blower 61 includes a blower 62 accommodated so as to be rotatable in a scroll case that is integrally formed with the air conditioning duct 7; and a blower motor 63 configured to drive the blower 62 such that the blower 62 is rotated.

In the blower motor 63, a blower air amount (a rotational speed of the blower 62) is controlled on the basis of a blower terminal voltage that is applied to the blower motor 63 via a blower drive circuit 63a (see FIG. 3).

The refrigerant circulation circuit 8 is configured to include the compressor 81; a condenser 82 into which a refrigerant discharged from an outlet of this compressor 81 flows; a receiver (a gas-liquid separator) 83 that separates the condensed and liquefied refrigerant into gas and a liquid, and causes only the liquid refrigerant to flow to the downstream side; an expansion valve (pressure-reducing unit) 84 that reduces a pressure of the liquid refrigerant and expands the liquid refrigerant; an evaporator 85 that vaporizes the refrigerant after the pressure of the refrigerant is reduced and the refrigerant is expanded; refrigerant piping 86 that connects these components in an annular shape; and the like.

In a portion of the air passage in a longitudinal direction thereof, the evaporator 85 is disposed across the entire air passage.

The compressor 81 compresses and discharges the suctioned refrigerant and is configured as an electric compressor driven by an electric motor 87. The electric motor 87 is an alternating-current (AC) motor, and the operation (a rotational speed) of the electric motor 87 is controlled by an AC voltage output from an unillustrated inverter. When power that is generated in accordance with the operation of this electric motor 87 is transmitted to the compressor 81, the refrigerant is circulated through the refrigerant circulation circuit 8, and thus, the air is cooled due to the vaporization of the refrigerant in the evaporator 85. When the electric motor 87 is stopped, the compressor 81 is also stopped, and the refrigerant is no longer circulated through the refrigerant circulation circuit 8.

The condenser 82 condenses and liquefies the refrigerant that has been compressed in the compressor 81. More specifically, in this condenser 82, heat is exchanged between the refrigerant and each of the outside air blown by a cooling fan 88 and travel wind (during travel of the vehicle) such that the refrigerant is condensed and liquefied.

The coolant circuit 9 is a circuit configured to circulate a coolant, which has been warmed in a water jacket of an engine EG, with the use of a water pump 93. The coolant circuit 9 includes a heater core 91.

An engine coolant flows through this heater core 91, and the heater core 91 heats the air by using this engine coolant as a heater heat source. In addition to the heater core 91, this coolant circuit 9 includes a radiator that radiates the heat of the engine coolant to the atmosphere; a thermostat configured to switch a circulation path of the coolant; and the like. Neither the radiator nor the thermostat is shown. Since configurations of these components are well known, a description thereon will not be provided.

The heater core 91 is disposed in a portion of the air passage, the portion being located downstream of the evaporator 85 (in other words, the heater core 91 is disposed in, for example, a lower half of a portion of the air passage in the longitudinal direction).

An air-mix (A/M) door 92 is attached to an upstream side of the heater core 91 such that the A/M door 92 is rotatable. This A/M door 92 is driven by an actuator 92a (see FIG. 3) such as a servomotor and changes a ratio between an amount of air passing through the heater core 91 and an amount of air bypassing the heater core 91 in accordance with a stop position thereof from a MAX COOL position where all the air bypasses the heater core 91 to a MAX HOT position where all the air flows through the heater core 91, so as to adjust a temperature of the air blown into the cabin.

As shown in FIG. 3, the air conditioner ECU 200 controls the compressor 81 (the electric motor 87) of the air conditioning unit 6, the actuators 73a, 77a, 78a, 92a, and the like in accordance with an in-cabin air conditioning request. Although not shown, this air conditioner ECU 200 is a generally-known electronic control unit (ECU) and includes a central processing unit (CPU), read only memory (ROM), random access memory (RAM), backup RAM, and the like.

The ROM stores various control programs, maps that are referred to when any of those various control programs is executed, and the like. The CPU executes calculation processing (computation processing) on the basis of the various control programs and the maps stored in the ROM. The RAM is memory that temporarily stores a calculation result obtained by the CPU, data received from each sensor, and the like. The backup RAM is non-volatile memory that stores data on the engine EG to be saved and the like during stop of the engine EG.

As shown in FIG. 3, the air conditioner ECU 200 receives switch signals from various switches on an air conditioner operation panel 400 provided on a front surface (an instrument panel) in the cabin, and also receives sensor signals from the various sensors.

The various switches provided on the air conditioner operation panel 400 include an automatic (AUTO) switch used to automatically control the air conditioning unit 6; an air conditioner (A/C) switch used to forcibly operate the compressor 81; a suction port switching switch used to switch the suction port mode; a temperature setting switch used to set a temperature in the cabin to a desired temperature; an air amount switching switch used to set an air blow amount of the blower 62 in a manual mode; and an outlet port switching switch used to switch the outlet port mode.

The various sensors connected to the air conditioner ECU 200 include an inside air temperature sensor 110 that detects an air temperature in the cabin; an outside air temperature sensor 111 that detects the air temperature outside the cabin; a solar radiation sensor 112 that detects an amount of solar radiation toward the inside of the cabin; an evaporator temperature sensor 113 that detects a temperature of the evaporator 85; a coolant temperature sensor 114 that detects a temperature of the engine coolant flowing into the heater core 91; and a refrigerant pressure sensor 115 that detects high pressures (a condensation pressure and a discharging pressure) in the refrigerant circulation circuit 8.

The air conditioner ECU 200 also receives an operation signal from a wiper device 116 and an operation signal from an ignition switch 117. The operation signals from this wiper device 116 include a signal indicating the number of operations at the time when a driver of the vehicle 2 operates a wiper lever (not shown) to operate the wiper device 116; and a signal indicating a time period in which the wiper device 116 is continuously operated. The operation signal from the ignition switch 117 is output when the driver of the vehicle 2 performs an ON operation on the ignition switch 117.

The electric motor (the electric motor for the compressor 81) 87, the actuators 73a, 77a, 78a, 92a, and the blower drive circuit 63a are connected to the air conditioner ECU 200. The air conditioner ECU 200 controls these components in accordance with the in-cabin air conditioning request.

Next, a description will be provided on compressor stop permission control as a characteristic of this embodiment.

Figure 4:
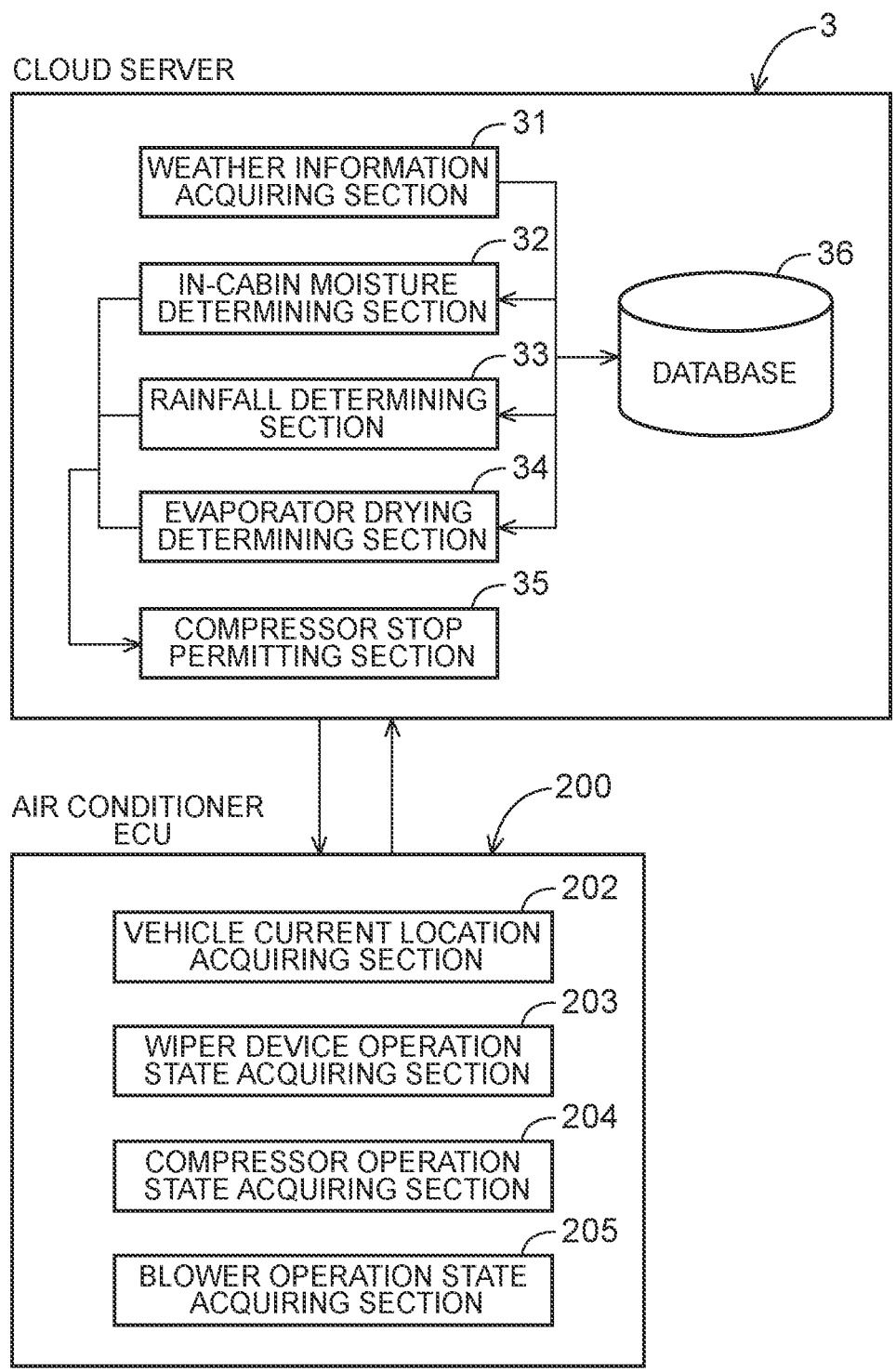
FIG. 4 is a functional block diagram of a cloud server and an air conditioner electronic control unit (ECU)

First, a description will be provided on configurations of the cloud server 3 and the air conditioner ECU 200 for execution of this compressor stop permission control. FIG. 4 is a functional block diagram of functional portions of the cloud server 3 and the air conditioner ECU 200 for the execution of the compressor stop permission control.

As shown in FIG. 4, the cloud server 3 includes a weather information acquiring section 31, an in-cabin moisture determining section 32, a rainfall determining section 33, an evaporator drying determining section 34, and a compressor stop permitting section 35. The air conditioner ECU 200 includes a vehicle current location acquiring section 202, a wiper device operation state acquiring section 203, a compressor operation state acquiring section 204, and a blower operation state acquiring section 205.

A description will hereinafter be provided on functions and operation of the weather information acquiring section 31, the in-cabin moisture determining section 32, the rainfall determining section 33, the evaporator drying determining section 34, and the compressor stop permitting section 35.

The weather information acquiring section 31 acquires weather information at the current location of the vehicle 2. More specifically, the weather information acquiring section 31 receives information on the current location of the vehicle 2, which is acquired by the vehicle current location acquiring section 202, from the air conditioner ECU 200 (i.e., receives via the transceiver 201), and acquires the weather information (information on presence or absence of rainfall, presence or absence of snowfall, presence or absence of accumulated snow, an outside air temperature, an outside air humidity level, and the like) at the received current location of the vehicle 2 from a meteorological bureau, a weather information provider, or the like.

This weather information acquiring section 31 associates information (location information) on the current location (ever-changing current locations in the case where the vehicle 2 travels) of the vehicle 2 acquired at specified time intervals in the last 24 hours (24 hours from a current time point) with the weather information at the current location, for example, and stores the information in a database 36. Thus, with regard to the information stored in the database 36, the information acquired prior to the last 24 hours is sequentially deleted. The information stored in the database 36 is thereby updated with the information in which the information on the current location of the vehicle 2 acquired in the immediately last 24 hours is associated with the weather information at the current location.

For example, the vehicle current location acquiring section 202 may acquire the current location of the vehicle 2 with the use of a Global Positioning System (GPS) function of the vehicle 2.

The in-cabin moisture determining section 32 determines presence or absence of moisture brought into the cabin of the vehicle 2 from the outside of the vehicle 2 on the basis of the weather information (including the information stored in the database 36) acquired by the weather information acquiring section 31.

Examples of a case where the moisture is brought into the cabin of the vehicle 2 from the outside of the vehicle 2 include a case where an umbrella that is wet due to rain is brought into the cabin and a case where the occupant wearing clothing or the like that is wet due to rain gets on the vehicle 2. The moisture that is brought in such a situation (the moisture brought into the cabin when the occupant gets on the vehicle) will be referred to as "moisture brought during getting-on" in the disclosure. The in-cabin moisture determining section 32 determines whether such a situation (a situation where the moisture is brought into the cabin) has occurred. That is, the in-cabin moisture determining section 32 determines whether the moisture ("the moisture brought during getting-on"), which will eventually be evaporated in the future and become a cause of fogging of the window, has been brought into the cabin.

More specifically, when a condition that the ON operation on the ignition switch 117 of the vehicle 2 is performed (for example, a condition that the cloud server 3 receives an operation signal from the ignition switch 117) is satisfied, it is determined that the occupant has gotten on the vehicle 2. In such a situation, in the case where it has rained or snowed or the snow has been accumulated within the last one hour (within one hour prior to the current time point) at the current location of the vehicle 2, it is determined that the moisture has been brought into the cabin ("the moisture brought during getting-on" is present). Meanwhile, in the case where it has not rained or snowed or the snow has not been accumulated within the last one hour, it is determined that the moisture has not been brought into the cabin ("the moisture brought during getting-on" is absent) (a procedure of this determining operation will be described later by using FIG. 6). The time period, based on which the determination is performed, is not limited to one hour and thus may be set to any time period.

An additional example of the case where the moisture is brought into the cabin of the vehicle 2 from the outside of the vehicle 2 is a case where the umbrella or the like that is wet due to rain was brought into the cabin in the past and the wet umbrella or the like remains in the cabin for a specified time period. In this case, the moisture is evaporated to increase the humidity level in the cabin, which further causes the fogging of the window. The moisture brought into the cabin in the past in the above-described situation (the moisture brought into the cabin in the past and evaporated) will be referred to as "brought and remaining moisture" in the disclosure. The in-cabin moisture determining section 32 determines whether such a situation (a situation where the moisture was brought into the cabin in the past and has been evaporated) occurs.

More specifically, when the condition that the ON operation on the ignition switch 117 of the vehicle 2 is performed is satisfied, it is determined that the occupant has gotten on the vehicle 2. Then, in the case where the occupant has gotten on the vehicle 2 (the ON operation of the ignition switch 117 has been performed) a plurality of times within the past 24 hours (within 24 hours prior to the current time point) and the situation where the "moisture brought during getting-on" is present has occurred within the past 24 hours, it is determined that the moisture has been brought into the cabin ("the brought and remaining moisture" is present). Meanwhile, in the case where the situation where the "moisture brought during getting-on" is present has not occurred within the past 24 hours, it is determined that the moisture has not been brought into the cabin ("the brought and remaining moisture" is absent) (a procedure of this determining operation will be described later by using FIG. 6). The time period, based on which the determination is performed, is not limited to 24 hours and thus may be set to any time period.

The rainfall determining section 33 determines the presence or absence of the rainfall at the current location of the vehicle 2. In the case where the rainfall is present at the current location of the vehicle 2 and the conditioned air is blown from the DEF outlet port 74b (in the case where the outlet port mode is set in the F/D mode or the DEF mode), high humid wind is blown onto the window and causes the fogging of the window. Thus, the above determination is performed to determine whether the fogging of the window is likely to occur. In addition, in the case where the rainfall is present at the current location of the vehicle 2, the window is cooled by rainwater and a temperature thereof is likely to be decreased (water vapor is likely to be condensed due to the low temperature of the window), which also causes the fogging of the window. Thus, the above determination is performed to determine whether the fogging of the window is likely to occur.

In this embodiment, as a method for determining the presence or absence of the rainfall at the current location of the vehicle 2, the weather information received from the meteorological bureau, the weather information provider, or the like is referred to, the operation state of the wiper device 116 mounted on the vehicle 2 is acquired by the wiper device operation state acquiring section 203, and wiper operation history is acquired (the wiper operation history is transmitted to the cloud server 3) and referred to. That is, in the case where the weather information is information indicating that the rainfall is present at the current location of the vehicle 2 and/or the wiper operation history corresponds to the presence of the rainfall at the current location of the vehicle 2, it is determined that the rainfall is present at the current location of the vehicle 2. Meanwhile, in the case where the weather information is information indicating the absence of the rainfall at the current location of the vehicle 2 and the wiper operation history corresponds to the absence of the rainfall at the current location of the vehicle 2, it is determined that the rainfall is absent at the current location of the vehicle 2 (a procedure of this determining operation will be described later by using FIG. 7). The description has been provided herein on the determination on the presence or absence of the rain fall. Similarly, the presence or absence of the snowfall is determined by referring to the weather information and acquiring and referring to the wiper operation history.

The evaporator drying determining section 34 estimates a water retention amount of the evaporator 85 (an amount of the moisture on a radiation fin and piping of the evaporator 85) from the acquired weather information and the operation state of the air conditioning unit 6, and determines whether the evaporator 85 is in a dry state. In the case where the water retention amount of the evaporator 85 is large, the moisture that has been eliminated by the evaporator 85 may flow into the cabin again, and the high humid wind may be blown onto the window, which may cause the fogging of the window. Thus, the above determination is performed to determine whether the fogging of the window is likely to occur.

In this embodiment, as a method for calculating the water retention amount of the evaporator 85, the water retention amount of the evaporator 85 is calculated by using compressor operation history (the compressor operation history transmitted to the cloud server 3) and blower operation history (the blower operation history transmitted to the cloud server 3). The compressor operation history is acquired when the compressor operation state acquiring section 204 acquires the outside air temperature and the outside air humidity level in the weather information, which is acquired from the meteorological bureau, the weather information provider, or the like, and the operation state of the compressor 81. The blower operation history is acquired when the blower operation state acquiring section 205 acquires the operation state of the blower motor 63. Then, in the case where the water retention amount of the evaporator 85 is smaller than a specified amount, the evaporator drying determining section 34 determines that the evaporator 85 is in the dry state. Meanwhile, in the case where the water retention amount of the evaporator 85 is equal to or larger than the specified amount, the evaporator drying determining section 34 determines that the evaporator 85 is not in the dry state. More specifically, the water retention amount of the evaporator 85 is estimated from a moisture amount (hereinafter referred to as the moisture moving amount) condensed by the evaporator 85 per unit amount (unit volume) of the air flowing through the air passage in the air conditioning duct 7 and an integrated amount of the air flowing through the air passage in the air conditioning duct 7. In the case where this water retention amount is smaller than the specified amount, the evaporator drying determining section 34 determines that the evaporator 85 is in the dry state. Meanwhile, in the case where this water retention amount is equal to or larger than the specified amount, the evaporator drying determining section 34 determines that the evaporator 85 is not in the dry state and that part of the moisture held in the evaporator 85 may flow into the cabin together with the conditioned air (a procedure of this determining operation will be described later by using FIG. 8).

The compressor stop permitting section 35 outputs the compressor stop permission signal for permitting the stop of the compressor 81 in the case where the in-cabin moisture determining section 32 determines that no moisture is brought into the cabin from the outside of the vehicle 2, the rainfall determining section 33 determines that the rainfall is absent at the current location of the vehicle 2, and the evaporator drying determining section 34 determines that the evaporator 85 is in the dry state. That is, in the case where no moisture is brought into the cabin from the outside of the vehicle 2, the rainfall is absent at the current location of the vehicle 2, and the evaporator 85 is in the dry state, none of the causes of the fogging of the window described above exists. Thus, even when dehumidifying operation is not performed by the evaporator 85, that is, even when the circulation of the refrigerant by the operation of the compressor 81 is not performed, the fogging of the window does not occur. For this reason, the compressor stop permitting section 35 outputs the compressor stop permission signal to permit the stop of the compressor 81.

This compressor stop permission signal is transmitted from the cloud server 3 to the air conditioner ECU 200 via the transceiver 201. Then, in a situation where there is no other compressor operation request (for example, a manual ON operation on the A/C switch or the like), the electric motor 87 is stopped by the air conditioner ECU 200, and the compressor 81 is stopped in conjunction with the stop of the electric motor 87. That is, the compressor 81 is stopped in a situation where the fogging of the window does not occur. As a result, while an energy consumption rate is improved, the fogging of the window can be reliably avoided.

Figure 5:
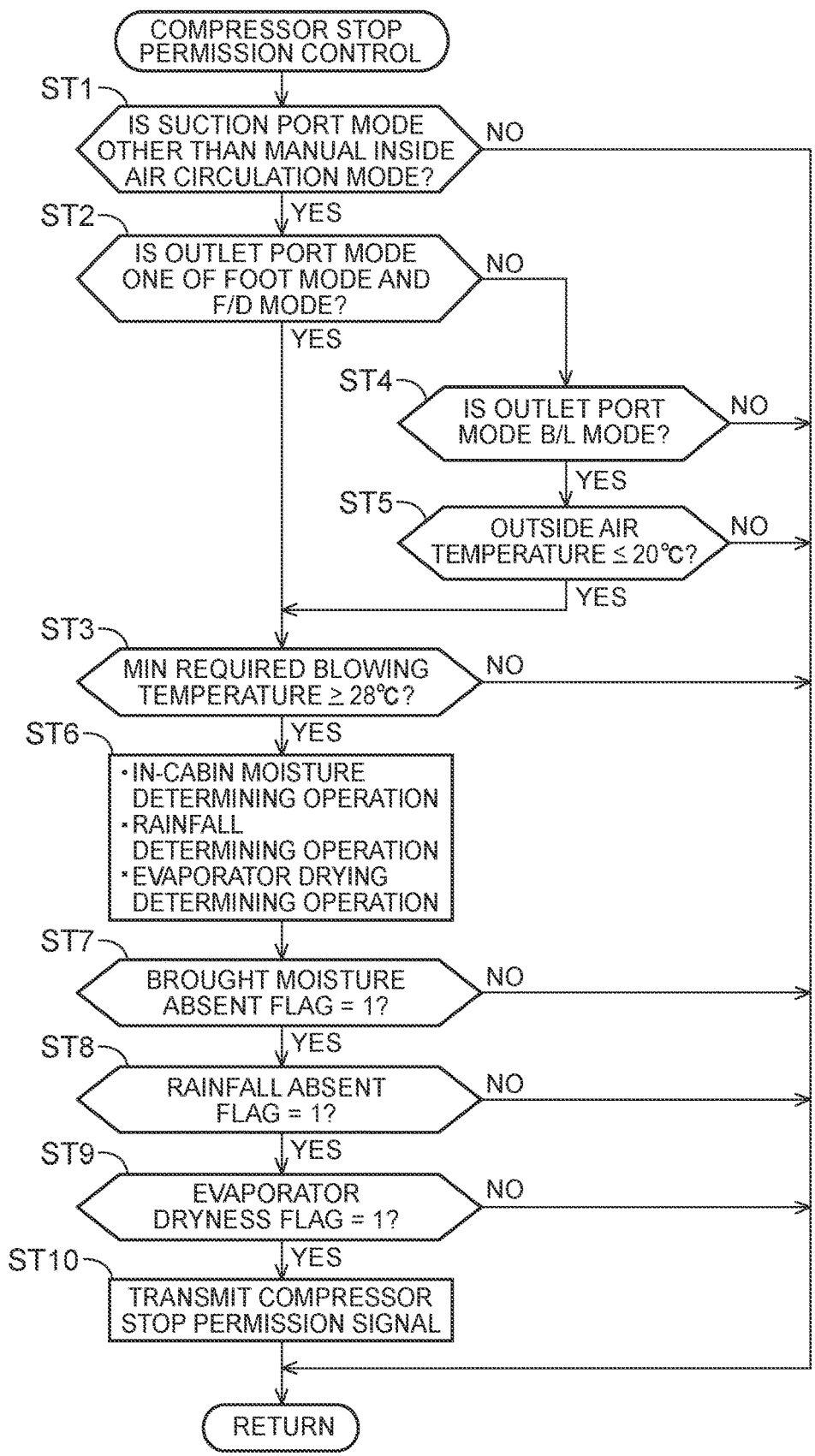
FIG. 5 is a flowchart illustrating a procedure of compressor stop permission control.
Figure 6:
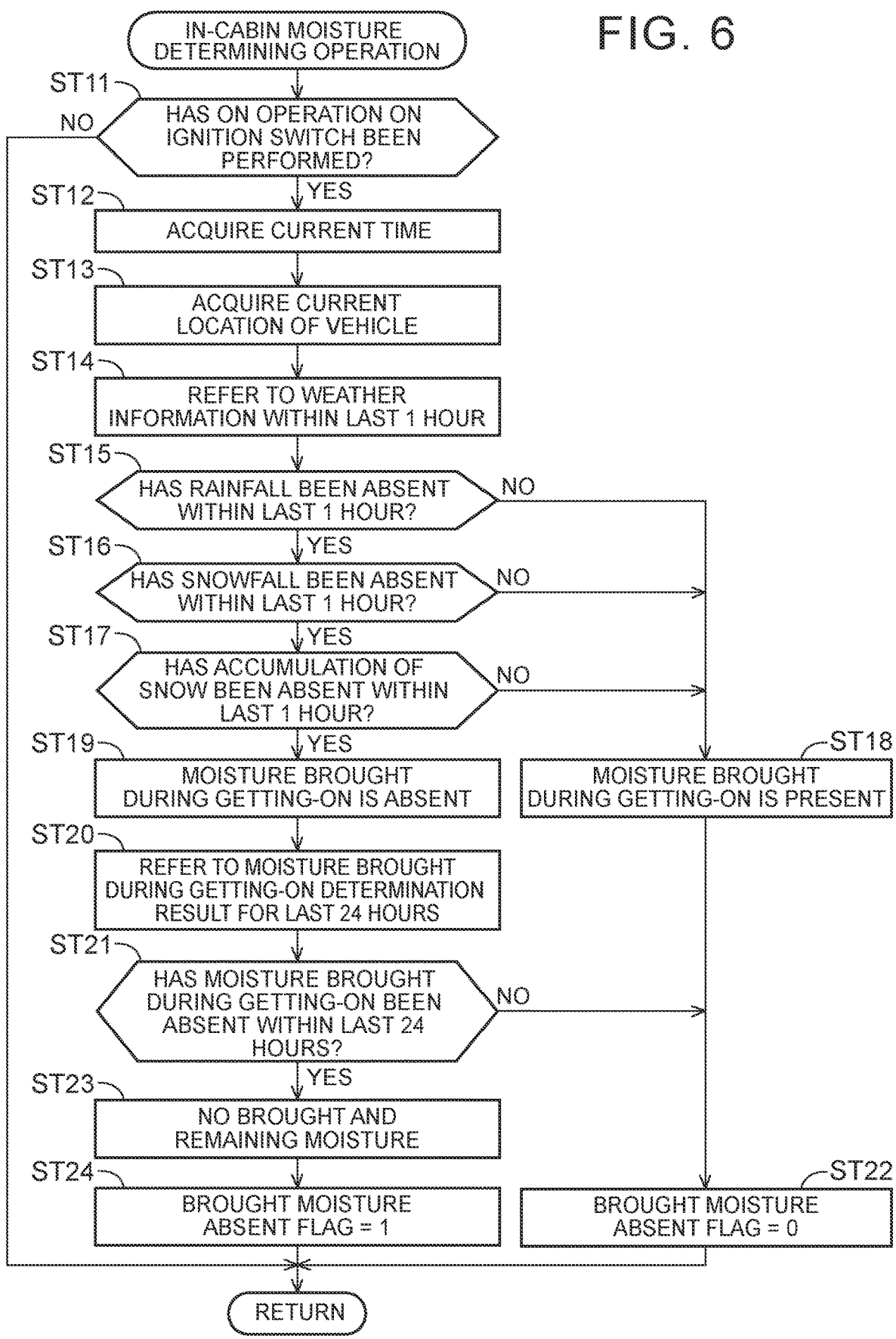
FIG. 6 is a flowchart illustrating a procedure of in-cabin moisture determining operation.
Figure 7:
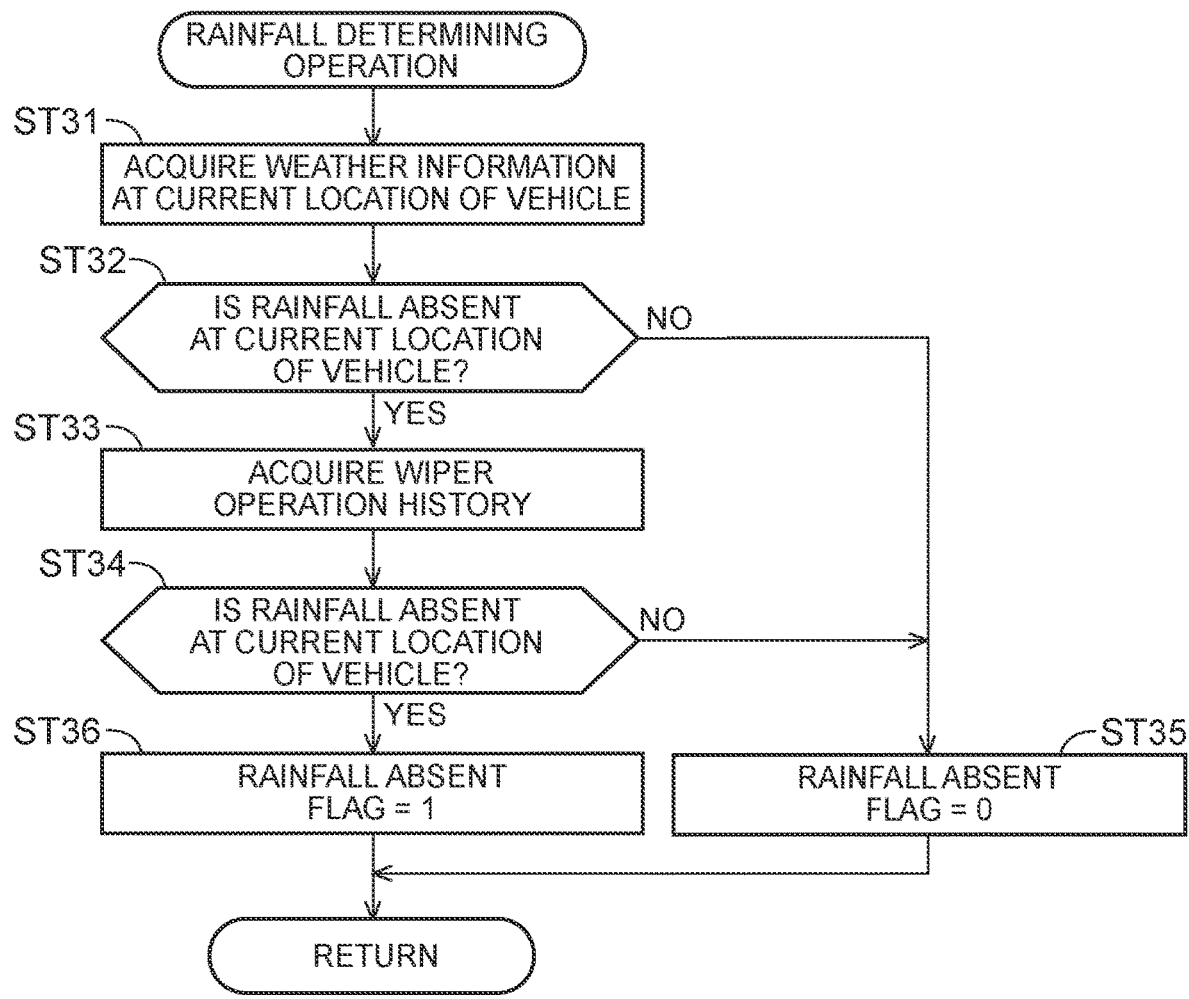
FIG. 7 is a flowchart illustrating a procedure of rainfall determining operation.
Figure 8:
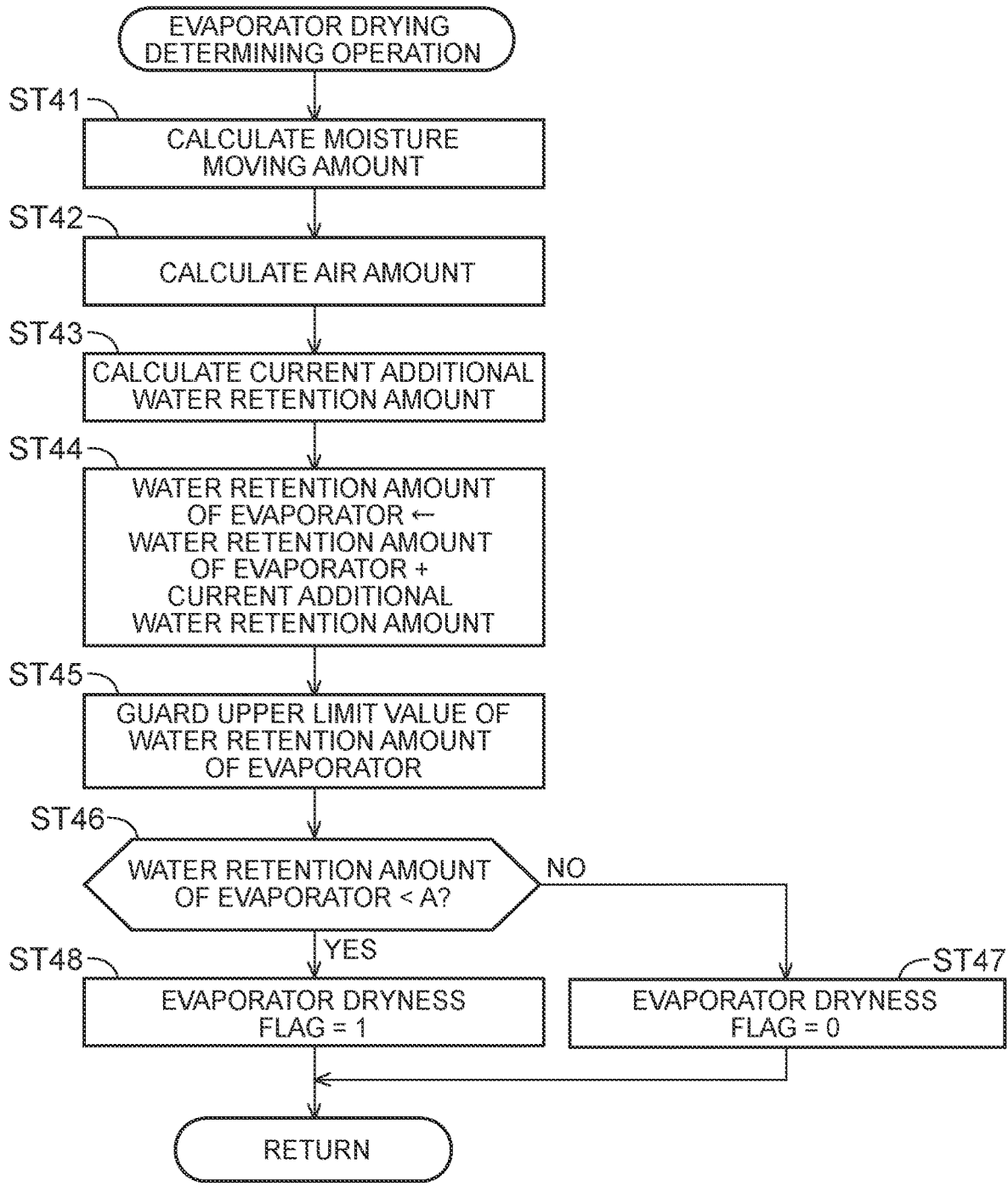
FIG. 8 is a flowchart illustrating a procedure of evaporator drying determining operation.

Next, a description will be provided on a specific procedure of the compressor stop permission control along flowcharts in FIG. 5 to FIG. 8. FIG. 5 is the flowchart illustrating the procedure of the compressor stop permission control. FIG. 6 is the flowchart (a subroutine) illustrating a procedure of in-cabin moisture determining operation in the in-cabin moisture determining section 32. FIG. 7 is the flowchart (a subroutine) illustrating a procedure of rainfall determining operation in the rainfall determining section 33. FIG. 8 is the flowchart (a subroutine) illustrating a procedure of evaporator drying determining operation in the evaporator drying determining section 34. These flowcharts are repeatedly executed at specified time intervals.

As shown in FIG. 5, in the compressor stop permission control, it is first determined in step ST1 whether the suction port mode of the air conditioning unit 6 is a mode (an outside air circulation mode or the like) other than the manual inside air circulation mode.

If the suction port mode of the air conditioning unit 6 is the manual inside air circulation mode and thus the determination is NO in step ST1, this control is terminated. In the case of the manual inside air circulation mode, the fogging of the window is likely to occur. Thus, the compressor 81 needs to circulate the refrigerant through the refrigerant circulation circuit 8 and the evaporator 85 needs to dehumidify the air. That is, the current situation is a situation where the stop of the compressor 81 cannot be permitted. Thus, this compressor stop permission control is terminated.

If the suction port mode of the air conditioning unit 6 is the mode other than the manual inside air circulation mode and thus the determination is YES in step ST1, the processing proceeds to step ST2, and it is determined whether the outlet port mode of the air conditioning unit 6 is the FOOT mode or the F/D mode (i.e., whether the outlet port mode of the air conditioning unit 6 is one of the FOOT mode and the F/D mode). If the outlet port mode is the FOOT mode or the F/D mode (i.e., the outlet port mode is one of the FOOT mode and the F/D mode) and thus the determination is YES in step ST2, the processing proceeds to step ST3, and it is determined whether a current required blowing temperature (a MIN required blowing temperature), which is set under control of the air conditioning unit 6, is equal to or higher than 28° C. These step ST2 and step ST3 are executed to determine whether a current operation state of the air conditioning unit 6 is a warming operation state. That is, when the air conditioning unit 6 performs the warming operation during automatic (AUTO) operation, the suction port mode is the outside air introduction mode (the outside air introduction mode in AUTO). In addition, in the case where the required blowing temperature (the MIN required blowing temperature) is relatively high during this warming operation, the outlet port mode is the FOOT mode. In the case where the outside air temperature is extremely low, the outlet port mode is the F/D mode. Thus, in the case where the determination is YES in both of step ST2 and step ST3, it can be determined that the air conditioning unit 6 performs the AUTO warming operation. That is, if the humidity level in the cabin is high, there is a possibility that the fogging of the window may occur in the future. Thus, it is necessary to determine whether the fogging of the window occurs by performing the determining operation (the in-cabin moisture determining operation, the rainfall determining operation, and the evaporator drying determining operation).

Meanwhile, if the outlet port mode of the air conditioning unit 6 is neither the FOOT mode nor the F/D mode and thus the determination is NO in step ST2, the processing proceeds to step ST4, and it is determined whether the outlet port mode of the air conditioning unit 6 is the B/L mode. In general, the outlet port mode of the air conditioning unit 6 is the B/L mode in a situation where the in-cabin temperature is stabilized at an appropriate temperature.

If the outlet port mode is not the B/L mode and thus the determination is NO in step ST4, this control is terminated. A reason for the termination is as follows. In the case where the outlet port mode is the FACE mode, it can be determined that the air conditioning unit 6 currently performs AUTO cooling operation. In such a case, the compressor 81 needs to circulate the refrigerant through the refrigerant circulation circuit 8 and the evaporator 85 needs to produce the conditioned air (cool air) (the current situation is a situation where the stop of the compressor 81 cannot be permitted). Meanwhile, in the case where the outlet port mode is the DEF mode, it can be determined that the driver requests elimination of the fogging of the window. Also, in such a case, the compressor 81 needs to circulate the refrigerant through the refrigerant circulation circuit 8, and the evaporator 85 needs to dehumidify the air (the current situation is a situation where the stop of the compressor 81 cannot be permitted).

If the outlet port mode is B/L mode and thus the determination is YES in step ST4, the processing proceeds to step ST5, and it is determined whether the outside air temperature is equal to or lower than 20° C. If the outside air temperature exceeds 20° C. and thus the determination is NO in step ST5, this control is terminated. The reason for the termination is as follows. In the case where the outside air temperature exceeds 20° C., the air conditioning unit 6 currently performs the AUTO cooling operation. Alternatively, the in-cabin temperature is the appropriate temperature, and, in order to bring the occupant to a head-cool feet-warm state (a state where the conditioned air at the relatively low temperature is blown to the head and the conditioned air at the relatively high temperature is blown to the feet), the compressor 81 needs to circulate the refrigerant through the refrigerant circulation circuit 8, and the evaporator 85 needs to produce the conditioned air (the cool air-: cool air blown to the head of the occupant to bring the user to the head-cool feet-warm state).

If the outside air temperature is equal to or lower than 20° C. and thus the determination is YES in step ST5, the processing proceeds to step ST3. That is, in the case where the outside air temperature is equal to or lower than 20° C. in the situation where the in-cabin temperature is stabilized at the appropriate temperature (the B/L mode), the outside air temperature is relatively low. Thus, the head-cool feet-warm state can be provided by introducing the outside air into the cabin and blowing the outside air toward the head of the occupant. In such a case, the compressor 81 does not need to be operated to produce the cool air. Thus, the processing proceeds to operation in step ST3 onward such that the compressor 81 can be stopped (the compressor 81 can be stopped in a situation where the fogging of the window does not occur in the warming operation state).

If the MIN required blowing temperature is lower than 28° C. and thus the determination is NO in step ST3, this control is terminated. The reason for the termination is as follows. In the case where the MIN required blowing temperature is lower than 28° C., it can be determined that the air conditioning unit 6 currently performs AUTO cooling operation. In such a case, the compressor 81 needs to circulate the refrigerant through the refrigerant circulation circuit 8, and the evaporator 85 needs to produce the conditioned air (the cool air).

The determining operation in these step ST1 to step ST5 may be executed by the cloud server 3 on the basis of the vehicle information (information on the operation state of the air conditioning unit 6) transmitted from the air conditioner ECU 200 to the cloud server 3, or may be executed by the air conditioner ECU 200.

If the MIN required blowing temperature is equal to or higher than 28° C. and thus the determination is YES in step ST3, the processing proceeds to step ST6, and the in-cabin moisture determining operation in the in-cabin moisture determining section 32, the rainfall determining operation in the rainfall determining section 33, and the evaporator drying determining operation in the evaporator drying determining section 34 are executed.

Hereinafter, the in-cabin moisture determining operation, rainfall determining operation, and evaporator drying determining operation will be separately described.

FIG. 6 is the flowchart illustrating the procedure of the in-cabin moisture determining operation. This flowchart is repeatedly executed at the specified time intervals.

It is first determined in step ST11 whether the ON operation on the ignition switch 117 of the vehicle 2 has been performed. This determination is performed based on the presence or absence of the operation signal (an ON operation signal) from the ignition switch 117.

If the ON operation on the ignition switch 117 has not been performed and thus the determination is NO in step ST11, this in-cabin moisture determining operation is stopped. On the other hand, if the ON operation on the ignition switch 117 has been performed and thus the determination is YES in step ST11, the processing proceeds to step ST12, and current time is acquired. Information on this current time is acquired from a clock provided in the cloud server 3. In addition, in step ST13, the information on the current location of the vehicle 2, which is acquired by the vehicle current location acquiring section 202, is acquired from the vehicle 2.

After the information on the current time and the information on the current location of the vehicle 2 are acquired as described above, in step ST14, at this current location of the vehicle 2, the weather information within one hour (within the last one hour) prior to the current time point (the time point at which the ON operation on the ignition switch 117 is performed) is referred to. That is, in the information stored in the database 36, the weather information within one hour prior to the current time point is acquired and referred to.

Then, it is determined in step ST15 whether the rainfall has been absent within the last one hour. If the rainfall has been present and thus the determination is NO in step ST15, the processing proceeds to step ST18. Then, based on a possibility that there is "the moisture brought during getting-on" in the cabin, it is determined that "the moisture brought during getting-on" is present. That is, based on the possibility that the moisture is brought into the cabin when the umbrella that is wet due to rain is brought into the cabin, or when the occupant wearing clothing or the like that is wet due to rain gets on the vehicle 2, it is determined that "the moisture brought during getting-on" is present. Thereafter, the processing proceeds to step ST22, and a brought moisture absent flag is set to "0".

On the other hand, if the rainfall has been absent within one hour and thus the determination is YES in step ST15, the processing proceeds to step ST16.

In step ST16, it is determined whether the snowfall has been absent within the last one hour. If the snowfall has been present and thus the determination is NO in step ST16, the processing proceeds to step ST18. Then, based on the possibility that there is "the moisture brought during getting-on" in the cabin, it is determined whether "the moisture brought during getting-on" is present. That is, based on the possibility that the moisture is brought into the cabin when the umbrella that is wet due to rain is brought into the cabin, or when the occupant wearing clothing or the like that is wet due to rain gets on the vehicle 2, it is determined that "the moisture brought during getting-on" is present. Thereafter, the processing proceeds to step ST22, and the brought moisture absent flag is set to "0".

On the other hand, if the snowfall has been absent within one hour and thus the determination is YES in step ST16, the processing proceeds to step ST17.

It is determined in step ST17 whether accumulated snow has been absent on a road surface or the like within the last one hour. If accumulated snow has been present and thus the determination is NO in step ST17, the processing proceeds to step ST18. Then, based on the possibility that there is "the moisture brought during getting-on" in the cabin, it is determined that "the moisture brought during getting-on" is present. That is, based on a possibility that the moisture is brought into the cabin when the occupant wearing shoes to which snow is attached gets on the vehicle 2, it is determined that "the moisture brought during getting-on" is present. Thereafter, the processing proceeds to step ST22, and the brought moisture absent flag is set to "0".

On the other hand, if the accumulated snow has been absent within the last one hour and thus the determination is YES in step ST17, the processing proceeds to step ST19. In this step ST19, it is determined that "the moisture brought during getting-on" is absent.

Thereafter, the processing proceeds to step ST20, and a result of the determining operations ("moisture brought during getting-on determinations") performed due to the ON operation on the ignition switch 117 within 24 hours prior to the current time point is acquired from the database 36 and referred to.

Then, it is determined in step ST21 whether it is determined that "the moisture brought during getting-on" has been absent in all of "the moisture brought during getting-on determinations" performed within the last 24 hours.

If it is determined that "the moisture brought during getting-on" has been present in "a single moisture brought during getting-on determination" among "the moisture brought during getting-on determinations" performed within the last 24 hours, the determination is NO in step ST21, and it is determined that there is a possibility that the moisture may have been brought into the cabin. Then, in step ST22, the brought moisture absent flag is set to "0". For example, a case where the umbrella wet due to rain has been brought into the cabin and remains in the cabin within the last 24 hours is assumed. In this case, even when none of the rainfall, the snowfall, and the accumulated snow is present, the rain (the water) on the umbrella that remains in the cabin may be evaporated to increase the humidity level in the cabin. Thus, it is determined that the moisture brought into the cabin is present, and the brought moisture absent flag is set to "0".

On the other hand, if it is determined that "the moisture brought during getting-on" has been absent in all of "the moisture brought during getting-on determinations" performed within the last 24 hours, the determination is YES in step ST21, and the processing proceeds to step ST23. In this step ST23, it is determined that "the brought and remaining moisture" is absent.

In this case, it is determined that "the moisture brought during getting-on" is absent (step ST19) and further, it is determined that "the brought and remaining moisture" is absent (step ST23). Thus, in step ST24, the brought moisture absent flag is set to "1".

As described above, in the determination on the presence or absence of the moisture brought into the cabin that is performed by the in-cabin moisture determining section 32, the brought moisture absent flag is set to "1" only in the case where none of the rainfall, the snowfall, and the accumulated snow has been present (i.e., all of the rainfall, the snowfall, and the accumulated snow have been absent) within the last one hour prior to the current time point (the time point at which the ON operation on the ignition switch 117 is performed) and it is determined that "the moisture brought during getting-on" has been absent in all of "the moisture brought during getting-on determinations" performed within the last 24 hours.

FIG. 7 is a flowchart illustrating the procedure of the rainfall determining operation. This flowchart is also repeatedly executed at specified time intervals.

First, in step ST31, the weather information is acquired. The weather information acquired at this time is information on the rainfall at the current location of the vehicle 2.

Thereafter, the processing proceeds to step ST32, and it is determined whether the rainfall is absent at the current location of the vehicle 2 on the basis of the weather information. If the rainfall is present at the current location of the vehicle 2 and thus the determination is NO in step ST32, a rainfall absent flag is set to "0" in step ST35.

On the other hand, if the rainfall is absent at the current location of the vehicle 2 and thus the determination is YES in step ST32, the processing proceeds to step ST33, and the wiper operation history is acquired from the wiper device operation state acquiring section 203.

Then, the processing proceeds to step ST34, and it is determined whether the rainfall is absent at the current location of the vehicle 2 based on the wiper operation history.

Here, a description will be provided on a method for determining the presence or absence of the rainfall at the current location of the vehicle 2 based on the wiper operation history. The operation of the wiper device 116 is initiated when the driver operates the wiper lever. Here, the operation on the wiper lever performed by the driver includes the operation for a purpose of eliminating the rain water attached to the window during the rainfall; and the operation for washer operation in which a windshield washer fluid is sprayed and the wiper device 116 is operated when the window is dirty. That is, in the case where the former operation is performed, it should be determined that the rainfall is present at the current location of the vehicle 2. In the case where the latter operation is performed, it should not be determined that the rainfall is present at the current location of the vehicle 2. In other words, it should be determined that the rainfall is absent at the current location of the vehicle 2. Thus, these operations need to be discriminated from each other. In this embodiment, the following method is used to make the discrimination. That is, in the case where the operation of the wiper device 116 continues for one minute or more, or in the case where the accumulated number of times that the operation on the wiper lever is performed by the driver in a specified time period is equal to or greater than a specified number (for example, seven times), it is determined that the rainfall is present at the current location of the vehicle 2. If not (in the case where the time period in which the operation of the wiper device 116 is performed is less than one minute or in the case where the accumulated number of times that the operation on the wiper lever is performed by the driver in the specified time period is less than the specified number), it is determined that the rainfall is absent at the current location of the vehicle 2.

If the rainfall is present at the current location of the vehicle 2 and thus the determination is NO in step ST34, the rainfall absent flag is set to "0" in step ST35.

On the other hand, if the rainfall is absent at the current location of the vehicle 2 and thus the determination is YES in step ST34, the processing proceeds to step ST36, and the rainfall absent flag is set to "1".

As described above, in the determination on the presence or absence of the rainfall that is performed by the rainfall determining section 33, the rainfall absent flag is set to "1" only in the case it is determined that the rainfall is absent on the basis of the weather information and further it is determined that the rainfall is absent on the basis of the wiper operation history.

FIG. 8 is the flowchart illustrating the procedure of the evaporator drying determining operation. This flowchart is also repeatedly executed at the specified time intervals.

First, in step ST41, the moisture moving amount is calculated. This calculating operation is performed by calculating the amount of moisture condensed by the evaporator 85 per unit amount of the air flowing through the air passage in the air conditioning duct 7 (more specifically, the air passing through the evaporator 85) from the outside air temperature, the outside air humidity level, an evaporator temperature, and the like. That is, as is well known, the air cooled by the evaporator 85 is condensed when the temperature of the air falls below a dew point. The condensed water amount can be calculated from the outside air temperature (the temperature of the air before being cooled), the outside air humidity level, and the evaporator temperature (the temperature of the air after being cooled). Here, the evaporator temperature is calculated from the compressor operation history acquired by the compressor operation state acquiring section 204. Alternatively, the evaporator temperature may be acquired from an output signal of the evaporator temperature sensor 113.

After the moisture moving amount is calculated as described above, the processing proceeds to step ST42, and the amount of the air that has passed through the evaporator 85 (the amount of the air that has passed through the evaporator 85 after a time point at which the air amount is calculated in the last routine) is calculated. More specifically, the air amount (i.e., the amount of the air) is calculated on the basis of the blower operation history acquired by the blower operation state acquiring section 205.

Then, in step ST43, the moisture moving amount is multiplied by the air amount to calculate a current additional water retention amount (i.e., the amount of water newly retained in the current routine). In step ST44, this current additional water retention amount is added to the water retention amount of the evaporator 85, which has been accumulated until the last routine, and thus, the acquired amount is calculated (i.e., regarded) as the new water retention amount of the evaporator 85.

The moisture on the radiation fin and the like of the evaporator 85 is dropped onto a drain pan or evaporated (for example, during a time period in which the ignition switch 117 is OFF). Thus, the water retention amount may be calculated in consideration of the above-described moisture. For example, the amounts (the amount of the dropped moisture and the amount of the evaporated moisture) are calculated in advance by an experiment or the like and subtracted from the water retention amount.

Thereafter, in step ST45, an upper limit value of the water retention amount of the evaporator 85, which is calculated in step ST44, is guarded. For example, the upper limit value is set to 50 g. In the case where the water retention amount calculated in step ST44 exceeds 50 g, this water retention amount is set to the upper limit value (50 g).

Thereafter, the processing proceeds to step ST46, and it is determined whether the water retention amount of the evaporator 85 is smaller than a specified amount A (for example, 10 g). This specified amount A serves as a threshold for determining whether the evaporator 85 is in the dry state, and can be set to any amount.

If the water retention amount of the evaporator 85 is equal to or larger than the specified amount A and thus the determination is NO in step ST46, an evaporator dryness flag is set to "0" in step ST47.

On the other hand, if the water retention amount of the evaporator 85 is smaller than the specified amount A and thus the determination is YES in step ST46, the processing proceeds to step ST48, and the evaporator dryness flag is set to "1".

In a state where each of the flags is set as described so far, the processing proceeds to step ST7 in the flowchart shown in FIG. 5.

In step ST7, it is determined whether the brought moisture absent flag is set to "1". If the brought moisture absent flag is set to "0" and thus the determination is NO in step ST7, this control is terminated. That is, the moisture has been brought into the cabin, and the fogging of the window may occur. Thus, since the current situation is a situation where the stop of the compressor 81 cannot be permitted, the compressor stop permission control is terminated.

If the brought moisture absent flag is set to "1" and thus the determination is YES in step ST7, the processing proceeds to step ST8, and it is determined whether the rainfall absent flag is set to "1". If the rainfall absent flag is set to "0" and thus the determination is NO in step ST8, this control is terminated. That is, the rainfall is present at the current location of the vehicle 2, and the fogging of the window may occur. Thus, since the current situation is a situation where the stop of the compressor 81 cannot be permitted, this compressor stop permission control is terminated.

If the rainfall absent flag is set to "1" and thus the determination is YES in step ST8, the processing proceeds to step ST9, and it is determined whether the evaporator dryness flag is set to "1". If the evaporator dryness flag is set to "0" and thus the determination is NO in step ST9, this control is terminated. That is, the water retention amount of the evaporator 85 is large, and the fogging of the window may occur when the moisture that has been eliminated by the evaporator 85 flows into the cabin again. Thus, since the current situation is a situation where the stop of the compressor 81 cannot be permitted, this compressor stop permission control is terminated.

If the evaporator dryness flag is set to "1" and thus the determination is YES in step ST9, the processing proceeds to step ST10, and the compressor stop permission signal is transmitted to the air conditioner ECU 200.

Then, the air conditioner ECU 200 that receives this compressor stop permission signal stops the compressor 81 in the case where there is no other compressor operation request (for example, the manual ON operation on an air conditioner switch or the like). That is, when the compressor 81 is stopped in the situation where the fogging of the window does not occur, the energy consumption rate can be improved.

A description will be provided on effects of the embodiment. As has been described so far, in this embodiment, the in-cabin moisture determining section 32 determines the presence or absence of the moisture brought into the cabin from the outside of the vehicle 2, the rainfall determining section 33 determines the presence or absence of the rainfall at the current location of the vehicle 2, and the evaporator drying determining section 34 determines whether the evaporator 85 is in the dry state. In this way, it is determined whether the stop of the compressor 81 can be permitted (the stop of the compressor 81 can be permitted based on the situation where the fogging of the window does not occur). Then, in the case where none of the above-described causes of the fogging of the window exists, the compressor stop permitting section 35 outputs the compressor stop permission signal, so as to permit the stop of the compressor 81. In this way, the compressor 81 is stopped in the situation where the fogging of the window does not occur. As a result, while the energy consumption rate is improved, the fogging of the window can be reliably avoided without using a humidity sensor. In addition, since the humidity sensor is not used, the configuration can be simplified, vehicle weight can be reduced, and cost can be reduced.

In this embodiment, the cloud server 3 includes the weather information acquiring section 31, the in-cabin moisture determining section 32, the rainfall determining section 33, the evaporator drying determining section 34, and the compressor stop permitting section 35. The air conditioner ECU 200 is configured to receive the compressor stop permission signal output from the compressor stop permitting section 35 in the cloud server 3. Accordingly, on the vehicle 2-side, the air conditioner ECU 200 determines whether to stop the compressor 81 in accordance with whether the compressor stop permission signal is received from the cloud server 3. Thus, a processing load of the air conditioner ECU 200 can be reduced.

In general, during the warming operation, the suction port mode is set to the outside air introduction mode for a purpose of restraining occurrence of the fogging of the window. However, as described in this embodiment, the stop of the compressor 81 is permitted in the case where none of the causes of the fogging of the window exists. Thus, even during the warming operation, the suction port mode can be set to the inside air circulation mode. That is, when the inside air, the temperature of which is already high, is circulated, an amount of heat that is lost by the heater core 91 can be reduced. Thus, in a hybrid vehicle or the like, for example, a period in which the engine EG is stopped can be made long. As a result, a fuel consumption rate can be improved.

Next, a description will be provided on a modified embodiment. In this modified embodiment, the in-cabin moisture determining section 32, the rainfall determining section 33, the evaporator drying determining section 34, and the compressor stop permitting section 35 are provided on the vehicle 2-side, that is, in the air conditioner ECU 200.

Figure 9:
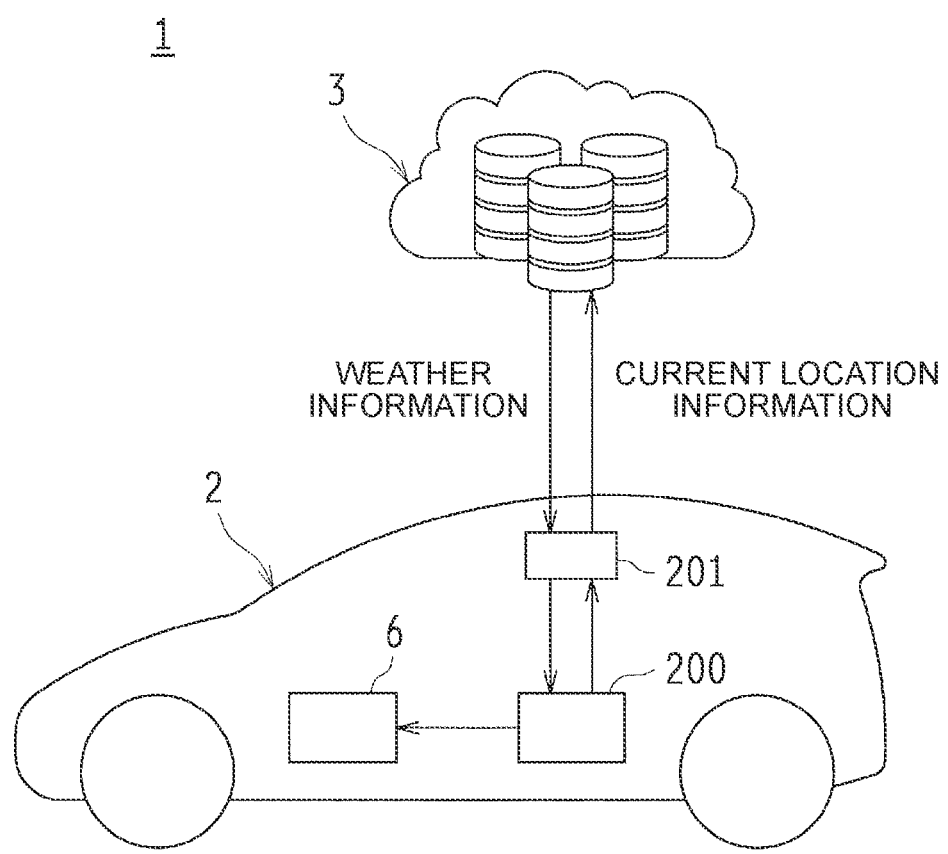
FIG. 9 is a view of a modified embodiment corresponding to FIG. 1.

In such a case, as shown in FIG. 9 (a view of this modified embodiment corresponding to FIG. 1), current location information (the information on the current location of the vehicle 2) is transmitted from the air conditioner ECU 200 to the cloud server 3, and the weather information (the information on the presence or absence of the rainfall, the presence or absence of the snowfall, the presence or absence of the accumulated snow, the outside air temperature, the outside air humidity level, and the like) is transmitted from the cloud server 3 to the air conditioner ECU 200.

In this modified embodiment, the determination on whether to permit the stop of the compressor 81 (whether to output the compressor stop permission signal) is performed by the vehicle 2-side (the air conditioner ECU 200). That is, the processing of the cloud server 3 is to transmit the weather information corresponding to the vehicle 2 (the weather information at the current location of the vehicle 2) to the vehicle 2. Thus, a processing load of the cloud server 3 can be reduced. As a result, in the case where this vehicle air conditioning system 1 is realized for a large number of the vehicles 2 as targets, practical utility of the vehicle air conditioning system 1 can be improved.

The disclosure is not limited to the embodiment and the modified embodiment, and all modifications and applications that are included in the scope of the disclosure may be made.

For example, in the embodiment and the modified embodiment, the compressor 81 provided in the refrigerant circulation circuit 8 is the electric compressor driven by the electric motor 87. However, the disclosure is not limited thereto. The compressor 81 may be a so-called mechanically-driven compressor that is driven by receiving power from the engine EG. In this case, an electromagnetic clutch is provided in a power transmission system between the engine EG and the compressor, and the compressor is stopped by disengaging this electromagnetic clutch.

The vehicle air conditioning system 1 in each of the embodiment and the modified embodiment includes the in-cabin moisture determining section 32, the rainfall determining section 33, and the evaporator drying determining section 34. However, the disclosure is not limited thereto. The vehicle air conditioning system 1 may include only the evaporator drying determining section 34 among these determining sections. That is, the compressor stop permitting section 35 may output the compressor stop permission signal in the case where it is determined that the evaporator 85 is in the dry state.

In the embodiment and the modified embodiment, when the condition that the ON operation on the ignition switch 117 is performed is satisfied, it is determined that the occupant has gotten on the vehicle 2. However, the disclosure is not limited thereto. A sensor may detect opening-closing operation of a door. Then, when a condition that the door is opened and closed is satisfied, it may be determined that the occupant has gotten on the vehicle 2. Alternatively, when a condition that the door is opened and closed and the ON operation on the ignition switch 117 is performed is satisfied, it may be determined that the occupant has gotten on the vehicle 2.

In the embodiment and the modified embodiment, as the in-cabin moisture determining operation in the in-cabin moisture determining section 32, both of the presence or absence of the "moisture brought during getting-on" and the presence or absence of the "brought and remaining moisture" are determined. However, the disclosure is not limited thereto, and only the presence or absence of the "moisture brought during getting-on" may be determined.

In the embodiment and the modified embodiment, as the rainfall determining operation in the rainfall determining section 33, the presence or absence of the rainfall is determined by referring to both of the weather information and the wiper operation history. However, the disclosure is not limited thereto. The presence or absence of the rainfall may be determined on the basis of one of those. In addition, as the method for determining the presence or absence of the rainfall, a rain sensor may be provided, and the presence or absence of the rainfall may be determined on the basis of an output signal from the rain sensor.

The disclosure can be applied to a vehicle air conditioning system in which an in-vehicle air conditioner and a cloud server communicate with each other.

What is claimed is:

1. A vehicle air conditioning system comprising:
   an in-vehicle air conditioner that includes a refrigerant circulation circuit including a compressor and an evaporator; and
   a controller configured to estimate a water retention amount of the evaporator based on weather information acquired and an operation state of the in-vehicle air conditioner, and to determine whether the evaporator is in a dry state, and output a permission signal for permitting stop of the compressor on a condition that the controller determines that the evaporator is in the dry state.

2. The vehicle air conditioning system according to claim 1 wherein the controller is configured to:

determine presence or absence of moisture brought into a cabin of the vehicle from an outside of the vehicle based on the weather information acquired, determine presence or absence of rainfall at the current location, and output the permission signal for permitting the stop of the compressor in a case where the controller determines that the moisture brought into the cabin from the outside of the vehicle is absent, the controller determines that the rainfall is absent at the current location, and the controller determines that the evaporator is in the dry state.

3. The vehicle air conditioning system according to claim 1, wherein the controller is configured to calculate the water retention amount that is an amount of water generated by condensation and retained in the evaporator based on the weather information acquired, an operation state of the compressor, and an amount of air passing through the evaporator, and to determine that the evaporator is in the dry state in a case where the calculated water retention amount is smaller than a specified amount.

4. The vehicle air conditioning system according to claim 2, wherein:

the moisture brought into the cabin of the vehicle from the outside of the vehicle includes moisture brought during entry that is moisture brought into the cabin when an occupant enters the vehicle; and the controller is configured to determine that the moisture brought during entry is absent in a case where all of snowfall, accumulated snow, and the rainfall have been absent at the current location where the vehicle is stopped within a past specified period prior to a time point at which the occupant enters the vehicle.

5. The vehicle air conditioning system according to claim 4, wherein:

the moisture brought into the cabin of the vehicle from the outside of the vehicle includes brought and remaining moisture that is moisture brought into the cabin in a past period and that has evaporated; and the controller is configured to determine that the brought and remaining moisture is absent in a case where the occupant has entered the vehicle a plurality of times within the past specified period prior to the time point at which the occupant currently enters the vehicle, and the in-cabin moisture determining section determines that the moisture brought during entry has been absent during all of the occasions where the occupant has entered the vehicle within the past specified period.

6. The vehicle air conditioning system according to claim 2, wherein the controller is configured to acquire the weather information at the current location of the vehicle, and operation information on a wiper device mounted on the vehicle, and to determine that the rainfall is absent at the current location of the vehicle in a case where each of the weather information and the operation information on the wiper device is information based on which the rainfall is determined to be absent.

7. The vehicle air conditioning system according to claim 2, further comprising:

a cloud server configured to communicate with the vehicle and acquire the weather information; and the cloud server is configured to receive information on the current location from the vehicle and to transmit the weather information on the current location to the vehicle.

8. A vehicle air conditioning system comprising:

an in-vehicle air conditioner that includes a refrigerant circulation circuit including a compressor and an evaporator;

a controller for the in-vehicle air conditioner; and a server configured to communicate with the controller;

acquire weather information at a current location of a vehicle;

estimate a water retention amount of the evaporator based on the weather information acquired by the server and an operation state of the in-vehicle air conditioner, and to determine whether the evaporator is in a dry state; and output, to the controller, a permission signal for permitting stop of the compressor on a condition that the server determines that the evaporator is in the dry state.

9. The vehicle air conditioning system according to claim 8 wherein the server is configured to:

determine presence or absence of moisture brought into a cabin of the vehicle from an outside of the vehicle based on the weather information acquired by the server, determine presence or absence of rainfall at the current location, and output the permission signal for permitting the stop of the compressor in a case where the server determines that the moisture brought into the cabin from the outside of the vehicle is absent, the server determines that the rainfall is absent at the current location, and the server determines that the evaporator is in the dry state.

10. The vehicle air conditioning system according to claim 8, wherein the server is configured to calculate the water retention amount that is an amount of water generated by condensation and retained in the evaporator based on the weather information acquired by the server, an operation state of the compressor, and an amount of air passing through the evaporator, and to determine that the evaporator is in the dry state in a case where the calculated water retention amount is smaller than a specified amount.

11. The vehicle air conditioning system according to claim 9, wherein:

the moisture brought into the cabin of the vehicle from the outside of the vehicle includes moisture brought during entry that is moisture brought into the cabin when an occupant enters the vehicle; and the server is configured to determine that the moisture brought during entry is absent in a case where all of snowfall, accumulated snow, and the rainfall have been absent at the current location where the vehicle is stopped within a past specified period prior to a time point at which the occupant enters the vehicle.

12. The vehicle air conditioning system according to claim 11, wherein:

the moisture brought into the cabin of the vehicle from the outside of the vehicle includes brought and remaining moisture that is moisture brought into the cabin in a past period and that has evaporated; and the server is configured to determine that the brought and remaining moisture is absent in a case where the occupant has entered the vehicle a plurality of times within the past specified period prior to the time point at which the occupant currently enters the vehicle, and the in-cabin moisture determining section determines that the moisture brought during entry has been absent during all of the occasions where the occupant has entered the vehicle within the past specified period.

13. The vehicle air conditioning system according to claim 9, wherein the server is configured to acquire operation information on a wiper device mounted on the vehicle, and to determine that the rainfall is absent at the current location of the vehicle in a case where each of the weather information and the operation information on the wiper device is information based on which the rainfall is determined to be absent.

* * * * *